US000001806H

United States Statutory Invention Registration [19]

[11] Reg. Number: H1,806

[45] Published: Oct. 5, 1999

Ammons et al.

[54] VARIABLE RADAR ALTIMETER TEST APPARATUS

[75] Inventors: Troy W. Ammons, Temple Hills; Lawrence G. Miller, Charlotte Hall, both of Md.

[73] Assignee: The United States of America as represented by the Secretary of the Navy, Washington, D.C.

[21] Appl. No.: 08/724,004

[22] Filed: Sep. 30, 1996

[51] Int. Cl.[6] ..... G01S 7/40

[52] U.S. Cl. ..... 342/165; 342/120

[58] Field of Search ..... 342/165, 169, 342/170, 171, 172, 173, 174

[56] References Cited

U.S. PATENT DOCUMENTS

| | | | |
|---|---|---|---|
| 3,955,199 | 5/1976 | Hutzelman et al. | 342/171 |
| 4,121,213 | 10/1978 | Bush et al. | 342/172 |
| 4,490,117 | 12/1984 | Parker | 434/35 |
| 4,531,127 | 7/1985 | Springer | 342/165 |
| 4,679,049 | 7/1987 | Riffiod | 342/172 |
| 4,683,473 | 7/1987 | Haugland | 342/172 |
| 4,698,635 | 10/1987 | Hilton et al. | 342/64 |
| 4,945,360 | 7/1990 | Trummer et al. | 342/122 |
| 5,160,933 | 11/1992 | Hager | 342/174 |
| 5,260,874 | 11/1993 | Berner et al. | 364/424.03 |
| 5,300,934 | 4/1994 | Asbell et al. | 342/172 |

*Primary Examiner*—Bernarr E. Gregory
*Attorney, Agent, or Firm*—Edward J. Connors, Jr.

[57] ABSTRACT

A variable radar altimeter test system for providing a test of the altimeter portion of a flying object guidance system which simulates actual flight conditions includes an antenna connection to receive a signal from the flying object being tested, a synthesizer for generating a signal programmed to simulate data characteristic of a radar return signal, pulse modulation of the programmed signal to create a third signal which is returned to the flying object under test to stimulate the altimeter portion of its guidance system.

2 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

VARIABLE RADAR ALTIMETER TEST APPARATUS

This invention relates to a test apparatus and more particularly to an apparatus for testing the radar altimeter employed in the guidance system of a cruise missile or other radar guided flying device.

BACKGROUND OF THE INVENTION

In order to ensure proper operation of cruise missile systems and the like which employ radar guidance systems, it is desirable to test the system under conditions which simulate the operation of the missile system and its various guidance components under actual conditions. During such tests (static firing), the missile system is interfaced with a flight simulation program in order to perform (in simulation) the launch events of a planned flight. Following the simulated launch, the guidance system is stimulated by the simulation program with all of the data which it would experience during an actual flight. The data is recorded during the test in order to evaluate the missile performance including the guidance system. Of particular importance is the testing of the radar altimeter subassembly. The variable radar altimeter test system (VRATS) of this invention provides real time simulation of terrain reflected radar signals in order to verify that the radar altimeter functions properly during an entire flight.

Prior to this invention, flight simulation altitude data was required to be written into the guidance memory thus not providing a stimulation of the guidance system, and more particularly, the altimeter portion thereof, under the conditions it would encounter in an actual flight.

Accordingly, it is an object of this invention to provide a missile test system which simulates all of the altitude conditions which would be encountered in actual flight.

DETAILED DESCRIPTION OF THE PREFERRED EMBODIMENTS

Figure 1:
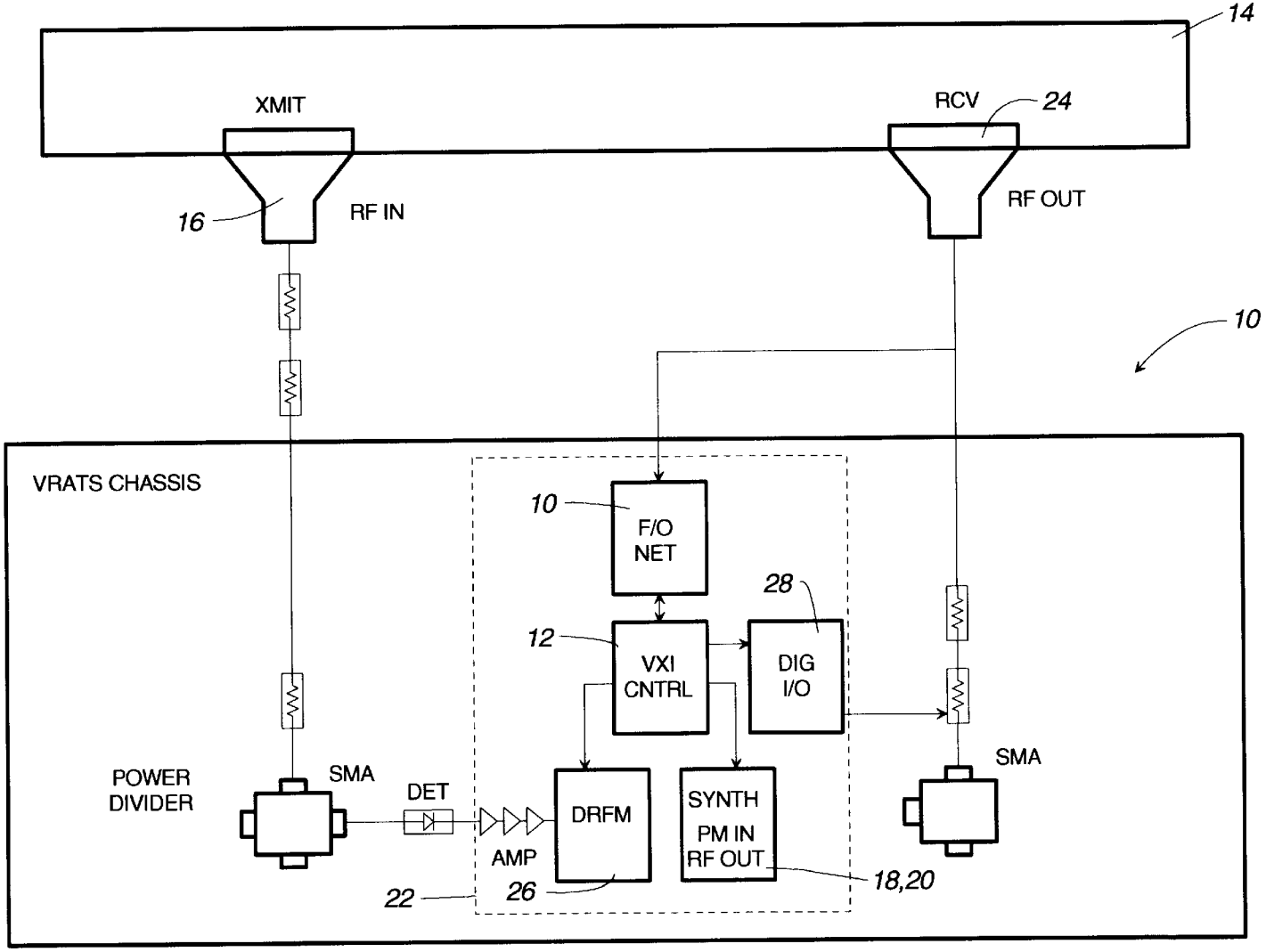
FIG. 1 is a schematic view of the test system of this invention.
Figure 2:
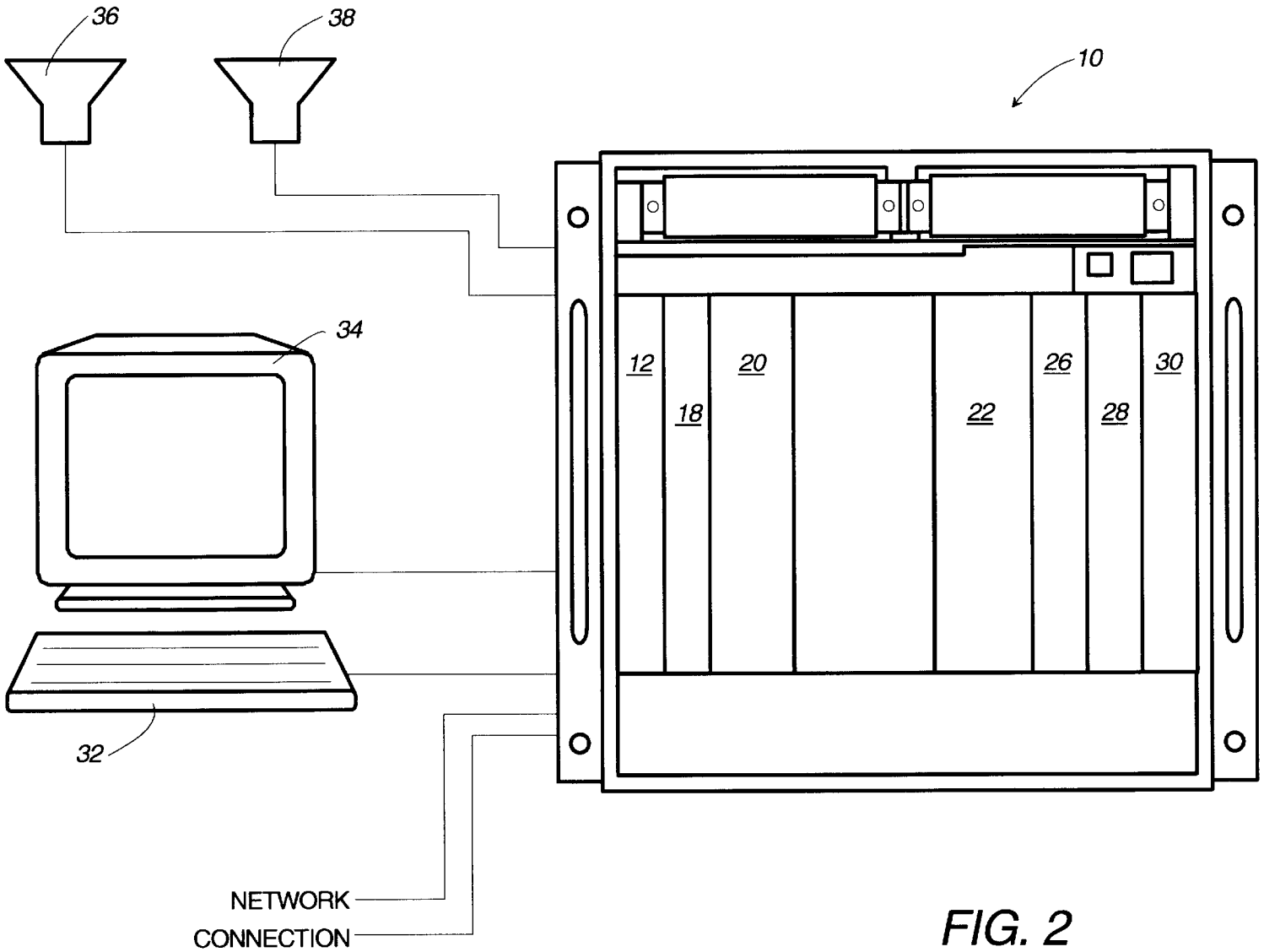
FIG. 2 a layout of the VRATS according to this invention.

Referring to FIGS. 1 and 2, a variable radar altimeter test system according to this invention is shown generally at 10.

The system includes a computer 12 which uses an Intel 80486DX4 processor. The system is designed to simulate a terrain reflect radar signal of the missile under test 14. The VRATS 10 detects a transmit signal 16 through antenna coupler and cables 36, 38 from the missile under test to create an envelope of the RF signal and a signal generated by a programmable synthesizer 18, 20 is pulse modulated by the envelope which is amplified and inverted by a video amplifier card 22. The pulsed RF signal is transmitted to the missile receiver 24. The synthesized RF signal has a time delay and attenuation characteristic of a radar return signal. Time delay is controlled in real time through the use of an RF delay module 26. Attenuation is manipulated in real time through program control of a digital input/output card 28. The control program reads simulation data from a fiber optic network card 30. Operator control initiates execution of the control program using keyboard 32 and monitor 34. Antenna couplers 36, 38 and cables are used to receive signals from and transmit signals to the missile under test 14.

It can be seen from the foregoing description that a variable radar altimeter test system according to this invention permits the missile under test to perform dynamically as it would in an actual flight. This permits the missile under test to use a large portion of its internal circuitry to sense and report altitude to the guidance computer. Altitude data collected from the guidance system is used to verify that the altimeter is capable of providing accurate data for the duration of a flight.

Figure 3:
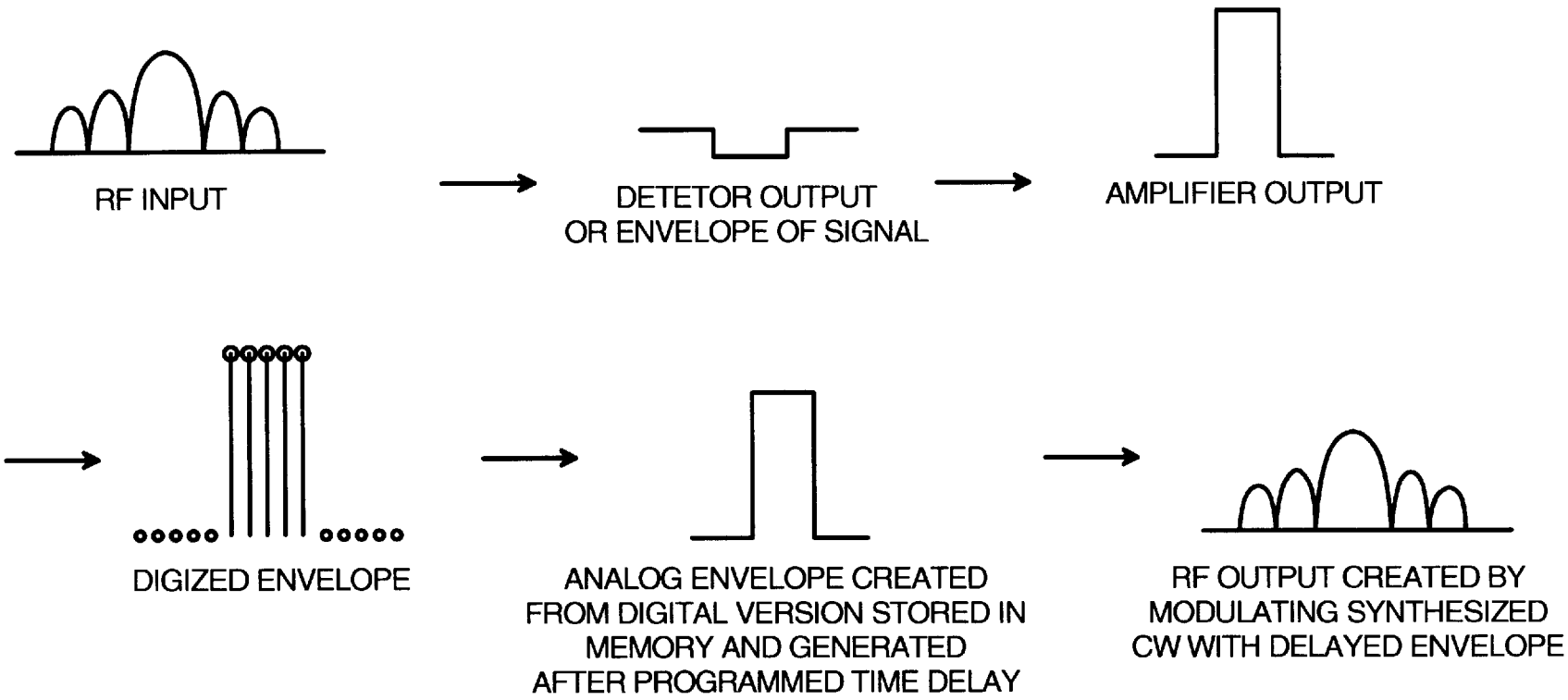
FIG. 3 shows the signal flow during operation of the VRATS

FIG. 3 shows the signal flow through the system during the operation described above.

We claim:

1. An apparatus for testing the altimeter portion of the guidance system of a flying object during a simulated flight including, means for detecting the envelope of a signal received from the flying object under test, means including a programmable synthesizer for creating programmable signal, means for pulse modulating the programmable signal with the envelope of the signal from the flying object to create a third signal, and means for transmitting the third signal to the flying object to stimulate the altimeter portion of the flying object guidance system.

2. An apparatus according to claim 1 wherein the third signal includes time delay and attenuation characterisic of a radar return signal.

* * * * *